United States Patent [19]

McDonald

[11] Patent Number: 5,783,259

[45] Date of Patent: *Jul. 21, 1998

[54] METHOD OF MANUFACTURING MOLDS, DIES OR FORMING TOOLS HAVING A CAVITY FORMED BY THERMAL SPRAYING

[75] Inventor: Robert R. McDonald, Traverse City, Mich.

[73] Assignee: Metallamics, Inc., Traverse City, Mich.

[*] Notice: The term of this patent shall not extend beyond the expiration date of Pat. No. 5,609,922.

[21] Appl. No.: 812,521

[22] Filed: Mar. 7, 1997

Related U.S. Application Data

[63] Continuation of Ser. No. 349,252, Dec. 5, 1994, Pat. No. 5,609,922.

[51] Int. Cl.$^6$ .............................. B05D 1/10; B29C 33/38
[52] U.S. Cl. ........................... 427/447; 249/116; 249/80; 427/135; 427/449; 427/455
[58] Field of Search ......................... 427/135, 133, 427/447, 449, 450, 451, 452, 453, 455, 456; 249/114.1, 116, 135, 80

[56] References Cited

U.S. PATENT DOCUMENTS

| | | | |
|---|---|---|---|
| 2,447,620 | 8/1948 | Singleton et al. | 249/114.1 |
| 2,958,609 | 11/1960 | Stoll et al. | 249/114.1 |
| 2,968,083 | 1/1961 | Lentz et al. | 264/30 |
| 2,984,887 | 5/1961 | Thiess | 249/114.1 |
| 3,429,962 | 2/1969 | Krystyniak | 264/309 |
| 3,609,829 | 10/1971 | Carrell et al. | 65/302 |
| 3,669,723 | 6/1972 | Parr et al. | 427/133 |
| 3,673,293 | 6/1972 | Teague | 249/114.1 |
| 3,789,910 | 2/1974 | Matter et al. | 425/271 |
| 3,826,301 | 7/1974 | Brooks | 164/46 |
| 3,909,921 | 10/1975 | Brooks | 164/46 |
| 3,916,418 | 10/1975 | Erdmann et al. | 343/912 |
| 3,928,907 | 12/1975 | Chisholm | 427/448 |
| 4,006,633 | 2/1977 | Shipman et al. | 164/154 |
| 4,018,552 | 4/1977 | Prast et al. | 249/80 |
| 4,120,930 | 10/1978 | Lemelson | 249/114.1 |
| 4,242,074 | 12/1980 | Lake | 425/292 |
| 4,304,747 | 12/1981 | Lake | 264/156 |
| 4,460,529 | 7/1984 | Schultze et al. | 264/81 |
| 4,482,513 | 11/1984 | Auletti | 264/45.1 |
| 4,547,415 | 10/1985 | Schultze et al. | 428/36 |
| 4,586,557 | 5/1986 | Evertz et al. | 427/135 |

(List continued on next page.)

FOREIGN PATENT DOCUMENTS

| | | | |
|---|---|---|---|
| 2196602 | 3/1974 | France | 249/135 |
| 3132437A1 | 3/1983 | Germany | 425/388 |

OTHER PUBLICATIONS

Thermal Spraying –Practice, Theory and Application, American Welding Society, Inc. of Miami, Florida, May, 1993.

*Primary Examiner*—Robert Davis
*Attorney, Agent, or Firm*—Reising, Ethington, Learman & McCulloch, PLLC

[57] ABSTRACT

Described are molds, dies and forming tools comprising: a) a heat exchanging body support member; and b) within the support member, a molding cavity portion formed by thermal spraying metallic particles to a desired configuration in the support member. Also described are methods of making a mold, die or forming tool comprising the steps of: a) providing a body support member having a controlled and designed porosity which permits the enhancement of the heat transfer ability of said mold, die or forming tool; b) configuring a surface of the support member to a desired cavity; and c) spraying particles to the configured cavity in the support member, thereby producing a mold, die or forming tool. Preferably, the materials of construction are metallic and are applied by thermal plasma spraying. The particles may also be ceramics, metal matrix composites, ceramic matrix composites, thermoplastic resins, thermoset resins, and composites based thereupon. The controlled porosity of the body of the mold, die and/or forming tool is as important as the use of thermal spray to subsequently form the cavity.

14 Claims, 2 Drawing Sheets

U.S. PATENT DOCUMENTS

| | | | |
|---|---|---|---|
| 4,919,718 | 4/1990 | Tiegs et al. | 75/232 |
| 4,947,024 | 8/1990 | Anderson | 219/137.61 |
| 4,966,220 | 10/1990 | Hesterberg et al. | 164/34 |
| 5,000,244 | 3/1991 | Osborne | 164/34 |
| 5,006,321 | 4/1991 | Dorfman et al. | 427/423 |
| 5,015,290 | 5/1991 | Tiegs et al. | 75/232 |
| 5,112,025 | 5/1992 | Nakayama et al. | 427/135 |
| 5,290,373 | 3/1994 | Donahue et al. | 148/549 |
| 5,312,584 | 5/1994 | Frasier et al. | 419/47 |
| 5,453,173 | 9/1995 | Oyama | 249/116 |
| 5,516,470 | 5/1996 | Larsson | 249/79 |

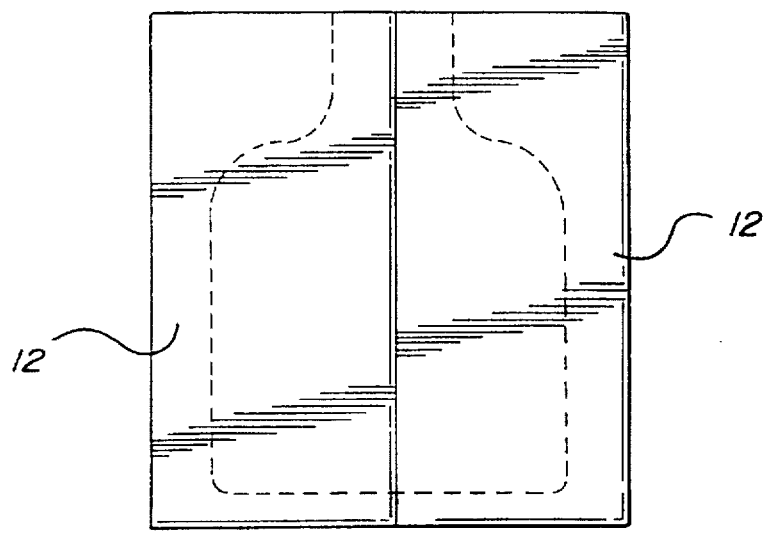
FIG-4
FIG-5
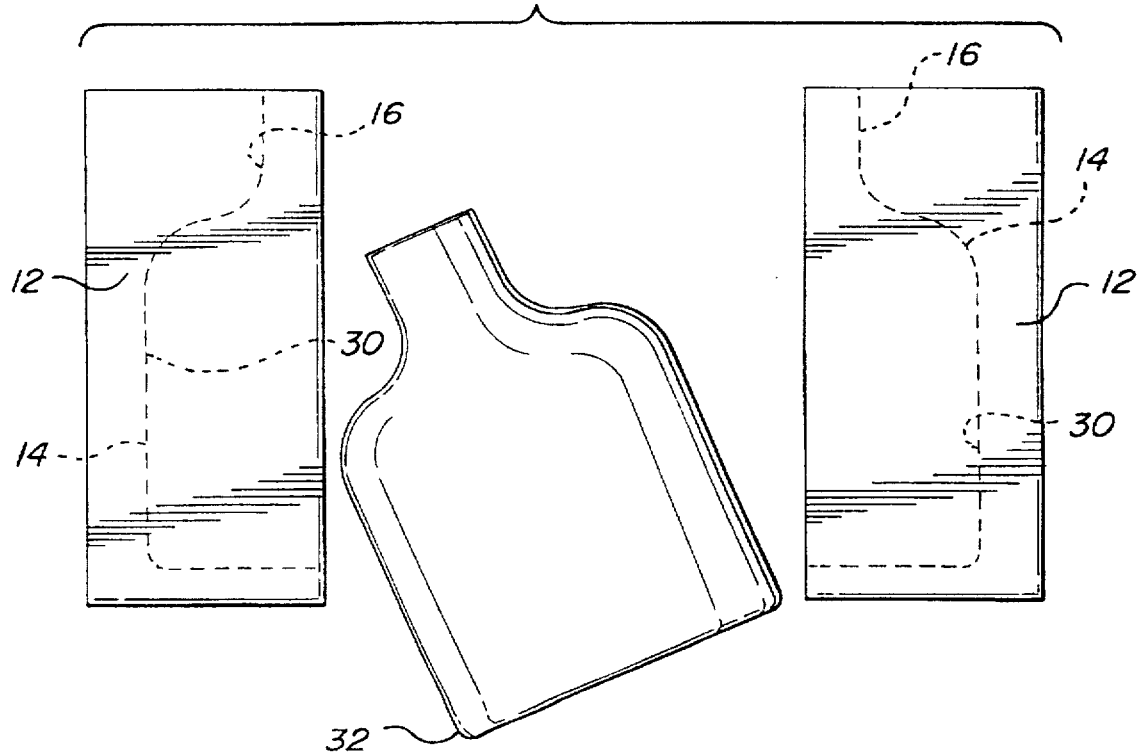

METHOD OF MANUFACTURING MOLDS, DIES OR FORMING TOOLS HAVING A CAVITY FORMED BY THERMAL SPRAYING

CROSS REFERENCE TO RELATED APPLICATION

This application is a continuation of U.S. Ser. No. 08/349,252, filed Dec. 5, 1994, now U.S. Pat. No. 5,609,922, issued Mar. 11, 1997.

TECHNICAL FIELD

The present invention relates to the fields of molds, dies, and other forming tools, their manufacture and their use in metal manufacturing and plastic manufacturing.

BACKGROUND ART

Molds are generally metallic and are comprised of a body portion and a cavity portion. A key feature to increased productivity for molding operations is to dissipate the heat that is generated during the molding process. In other words, the faster one can dissipate the heat in the molding operation, the faster one can increase the cycle time for molding.

Molding is used as a technique for fabricating metallic articles such as in shaping process. Molding is also used for the formation of thermoplastic and thermoset, as well as elastomeric materials which are generally characterized as plastic materials.

Thermal spraying is generally characterized as a group of processes in which finely divided metallic or non-metallic surfacing materials are deposited in a molten or semi-molten condition on a prepared substrate to form a spray deposit. "Thermal spraying" is a term generally applied to such other processes called arc spraying, flame spraying, and plasma spraying. The thermal spraying gun generates the necessary heat by using combustible gases or an electric arc. As the materials are heated, they change to a plastic or molten state and are accelerated by a compressed gas. The confined stream of particles are conveyed to the substrate. The particles strike the surface, flatten and form thin platelets (splats) that conform and adhere to the irregularities of the prepared surface and to each other. As the sprayed particles impinge upon the substrate, they cool and build-up, particle by particle, into a lamellar structure, thus a coating is formed. See "Thermal Spraying", Practice, Theory and Application, published by the American Welding Society, Inc. of Miami, Fla. (1995).

Plasma spraying is a thermal spraying process in which a non-transferred arc is utilized as the source of heat that ionizes a gas which melts and propels the coating material to the workpiece.

Flame spraying is a thermal spraying process in which an oxyfuel gas flame is the source of heat for melting the surfacing material. Compressed gas may or may not be used for atomizing and propelling the surfacing material to the substrate.

Arc spraying is a thermal spraying process utilizing an arc between two consumable electrodes of surfacing materials as a heat source and a compressed gas to atomize and propel the surfacing material to the substrate.

U.S. Pat. No. 3,429,962 discloses a thermal spray technique of forming a metallic oxide article. A rotatable mandrel 15 of, for example, copper or aluminum, has applied thereto a metallic oxide. The final product is obtained by chemically etching away the copper or aluminum mandrel. The end product is utilized as a fuel cell electrode. In a similar fashion, U.S. Pat. No. 5,006,321 pertains to the thermal spray method of producing glass mold plungers.

U.S. Pat. No. 4,460,529 describes the process of manufacturing a ceramic hollow body by the thermal spray technique. The ceramic bodies are comprised of aluminum and titanium carbides, borides, nitrides and mixtures thereof. The appropriate core material is selected so that it will not bind with the ceramic material. The reference indicates that the detachability of a mold core from the hollow body can be assured by the choice of a core with a higher coefficient of expansion relative to that of a ceramic or ceramic oxide layer.

U.S. Pat. No. 2,968,083 describes a hot patching of refractory structures utilizing a spraying of metal.

Other patents of interest include U.S. Pat. Nos. 5,290,373; 4,966,220; 5,000,244; 4,482,513; 4,304,747; 4,242,074; 4,547,415; 4,460,529; 3,916,418; 4,006,633; and 3,609,829.

It has been stated that spray deposits utilizing thermal spraying do not add strength to the substrate. *Thermal spraying*, supra at page 16. The present application, however, does utilize a body that can be cooled very quickly and the use of thermal spraying onto the body in forming the cavity of the mold allows for the design of a mold which will have extremely high strength to permit molding of plastic as well as metallic articles.

It is an object of the present invention to describe a mold or die having a body portion and a cavity portion wherein the cavity portion is formed in the body portion by means of a thermal spraying technique.

It is another object of the present invention to describe the manufacture of molds or dies having a body portion and a cavity portion wherein the cavity portion is formed by a thermal spraying technique.

It is a further object of the present invention to describe the manufacture of plastic or metallic parts by molding the desired materials in a mold that has a body portion and a cavity portion wherein the cavity portion is formed by thermal spraying metallic particles into the body portion.

It is a further object of the invention to describe a body portion of the invention which permits very high cooling rates and high flexibility in formation of a cooling means for the body.

SUMMARY OF THE INVENTION

Described is a mold or die comprising a porous heat exchanging body support member having a defined porosity; and within the support member a molding cavity portion formed by applying a metallic surface to a desired configuration in the support member.

Also described is a method of making a mold or die comprising the steps of:

(a) providing a porous heat exchanging body support member having a defined porosity;

(b) configuring a surface of the support member to a desired cavity; and (c) applying to the configured cavity in the support member a metallic surface thereby producing a mold or die.

BRIEF DESCRIPTION OF THE DRAWINGS

FIGS. 4 and 5 show a schematic process for molding and releasing a plastic product.

DESCRIPTION OF PREFERRED EMBODIMENTS

Figure 1:
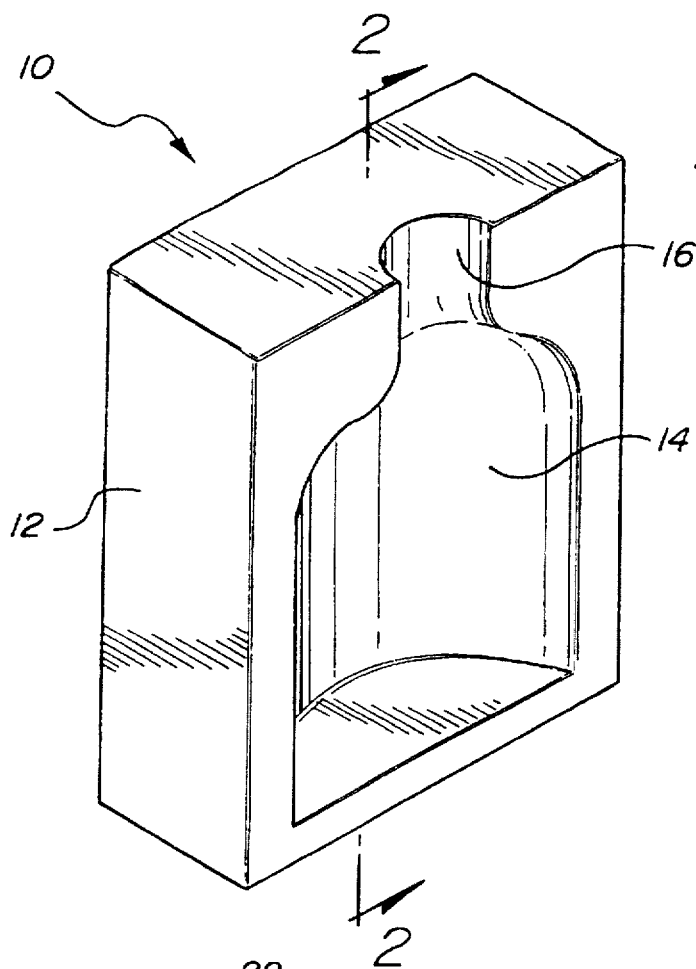
FIG. 1 is a schematic view of the mold or die of the present invention.

In the present application, the invention is broadly related to molds, dies, and other forming tools. The technology applies to tools that are used for the manufacture of parts based on thermoplastic resins, thermoset resins plus glass, metals and alloys.

For metals, molds means tools used for casting only. Dies are used for either forming or casting. One is able to produce dies and molds for the casting (such as die casting) and for the forming of metals (such as pressing a sheet or billet into a shape).

For glass part fabrication, molds and dies are used to which this technology is applicable. For parts based on thermoplastic resins, the primary processes are referred to as molding processes, i.e. compression molding, transfer molding, blow molding, injection molding, rotomolding, and thermoforming. In addition, dies are used. These include stamping dies. Moreover, extrusion dies are used for the fabrication of thermoplastic resin-based parts, i.e. film, sheet and profiles, e.g. tubes, rods and detailed shapes. This technology applies to all of these types of tools.

For parts based on thermoset resins, the processes utilize die forming of the part, such as, sheet pressed in dies to form a part followed by cross-linking to achieve strength and related properties. In addition, one has molds such as for the fabrication of urethane foam seating and the like. This technology applies to the manufacture of all such tooling.

There are also special part fabrication processes such as pultrusion, filament winding, structural reaction, injection molding, and resin transfer molding. In these processes, one may use a mold or die. This technology applies to the fabrication of such tooling.

In all these cases noted above, heat transfer efficiency and thermal control are key to the product quality and manufacturing economics of the parts made from the tools. Further, the manufacturing cost and turn around time of the mold, die or forming tool in all these cases is positively impacted.

This technology is universal in its applicability to the forming tools and to the parts made from thermoplastic resins, thermoset resins, glass metal, and alloy parts.

The use of the mold of the present invention allows for the formation of a body portion which can be very easily and rapidly cooled. The reason for such a rapid cooling body portion is that the cavity portion of a mold is applied to the body portion by use of a thermal spraying technique. Preferably, the thermal spraying is applied directly onto a substrate such as that formed in the body of a metallic portion.

The invention can also be characterized as the utilization of a body portion formed with controlled porosity. The body portion is preferably comprised of a foam metallic material such as foamed aluminum or aluminum alloys, or other metallic substances that can be readily foamed. Such foamed aluminum alloy is available commercially from Alcan Aluminum of Canada, or ERG of California.

The body portion may also be comprised of other metallic substances such as screen or mesh substances. The mesh that can be utilized is one that would have varying sizes of an orifice which would permit, as rapid as possible, flow of coolant of the cavity portion of the mold, yet at the same time, having sufficient strength to be used in a molding operation.

The body portion may also be comprised of other metallic substances. One such substance is called "tower packing materials". This line of products is used frequently in the petro-chemical industry to create surfaces for cracking condensation and heat transfer. Structured packings are available from Nutter Engineering, a unit of Patterson-Kelly Company, Division of Harsco Corporation of Tulsa, Okla. Such packing materials are called "Montz B1" or "A3" and the like. There are other such materials called "Nutter Ring Random Packing" from Nutter Engineering. The Nutter Ring is characterized by having an open half-ring with perforated center trough, flanged sides, and two tapered spacing hoops of different diameters. Other packing materials that can be utilized are called "Intalox™ High Performance Structured Packing" from Norton Chemical Process Products of Akron, Ohio. (Intalox™ is a trademark of Norton Chemical Process Products.) The Intalox™ system likewise has Snowflakes™ high performance packing which includes double corrugated sheet construction of various metals such as copper and the like. Also, Raschig rings provided by Norton Chemical Process Products can equally be applicable as well as Hy-pack Metal Packing or Metal Pall Rings. Other packing materials supplied by Norton are called "Flexipac" which utilizes a number of the aforementioned materials for structured packing. Other materials may likewise be utilized, such as "Koch Flexigrid" (trademark of Koch) for structured packing materials or "Flexitray" (trademark of Koch) for valve trays or "Flexiring" (dumped packing).

It is to be appreciated, with respect to all of the materials that have a configuration that is open and porous, that the materials would need to be configured or pressed or crushed to a desired size so that a surface can be adequately prepared for the application of the thermal spraying process.

Another material that may be utilized for the body of the mold component of the present invention is a sintered metal felt. The material is available to the trade under the trademark, Feltmetal™ (trademark of Technetics Corporation of Deland, Fla.). The fiber metal materials are sintered and are random metal fiber structures produced in the form of porous sheets. The materials offer a combination of metallic properties and make fiber materials suitable for a variety of support applications. The alloys that make up the fiber metal can be iron, chromium, aluminum, yttrium, stainless steel, nickel chromium alloys, nickel, copper, and titanium and alloy thereof. The material generally has a high porosity of 75%–95% per volume. The fiber metal materials are permeable with up to 0.05 m²/gm of active surface area. The stainless steel materials may, for example, have a density of 10% where the nickel metal fiber may have a 16% density. A suitable material may be TC3100 which is a nickel fiber that has a surface area of 4,000 square centimeters of surface per cc of metal volume. The thermal conductivity of the fiber metal materials can be described below in Table I.

TABLE I

Thermal Conductivity of Fiber Metal Materials

| Fiber Metal Materials | Density % | Thickness Inches | K BTU/hr/ ft/°F. | K % Solid |
|---|---|---|---|---|
| Nickel | 5 | 0.25 | 0.13 | 0.36 |

TABLE I-continued

Thermal Conductivity of Fiber Metal Materials

| Fiber Metal Materials | Density % | Thickness Inches | K BTU/hr/ ft/°F. | K % Solid |
|---|---|---|---|---|
| Nickel | 17 | 0.50 | 0.36 | 1.0 |
| Stainless Steel | 46 | 1.00 | 0.28 | 3.0 |

For comparison, the thermal conductivity of solid nickel is 36.0K BTU/hr/ft/°F. while 302 stainless steel is 9.4. Air is 0.014 for its thermal conductivity (data derived from Technetics Corporation Data Bulletin for TD-882 fiber metal materials). The fiber metal material is desirable due to its high porosity and therefore ease of cooling and ease of configuring for placement of cooling conduits. The fiber metal offers formability, weldability, resistance to shock and vibration, and load bearing capability in both tension and compression.

While applicant has described a variety of lightweight molds that may be produced using the various metallic substrates, it is to be appreciated that the invention is broadly directed towards tools. In other words, the invention is directed to dies and other tooling that are light in weight. Most tooling in the past has been extraordinarily heavy because the main portion of the tooling is a dense metallic body. Applicant has found by the combination of the thermal spraying that one can have a body which is extremely light in weight which would facilitate cooling of the tooling. By having such lightweight body materials, the tooling or die or mold can be readily configured to a variety of shapes in a cheaper and easier manufacturing of same.

In general, the materials for construction for the body portion can be characterized as a foam, a screen, a felt, tubing, honeycomb sintered spheres or packing tower material, and the like in order to have a controlled porosity.

The technique of this invention can be used to upgrade cheap materials, e.g. thermal spray cast iron substrates.

The molds or dies are preferably comprised of aluminum and its alloys, iron and its alloys, e.g. cast iron or nickel and its alloys, e.g., stainless steel.

In the thermal spraying process, any one of a number of commercially available pieces equipment can be utilized. Reference can be made to the publication "Thermal Spraying", supra, of the American Welding Society, in particular, chapter 2. The chapter describes typical wire flame spraying, powder flame spray process, an oxygen fuel gas detonation gun, an arc spray gun, a plasma torch which is part of a plasma spray system. All of the equipment is commercially available.

A wide variety of materials can be thermal sprayed onto the body forming the cavity of the mold. Suitable materials include metals, metallic oxides, metallic carbides, and metallic nitrides. The metals (oxides, carbides or nitrides) may be Groups 2, through and including 8, of the Periodic Table of Elements. In particular, the metal or metal oxides, metal carbides, or metal nitrides may be aluminum, titanium, silicon, iron, nickel, chrome, zinc, zirconium, calcium, yttrium, magnesium, copper, manganese, molybdenum, tin, antimony, lead, tungsten, boron, and mixtures thereof. In particular, ceramic oxide containing materials may be used such as blends of aluminum, titanium, silicon, iron oxides, and the like. Other preferred materials would be iron-based alloys such as those containing manganese, copper and iron; molybdenum, carbon and iron; chromium, nickel, molybdenum, silicon, carbon and iron, and the like. Other preferred metallic materials that could be applied by the thermal spray process would be nickel-based materials, namely, those that contain measurable amounts of nickel such as that from 10% on up to 100% by weight of nickel including various alloys thereof including aluminum nickel alloys; chromium, nickel alloys; chromium, aluminum, molybdenum, silicon, iron, boron, nickel alloys; nickel, iron, chrome, manganese and molybdenum alloys such as stainless steel, and the like. Other materials would be non-ferrous materials such as copper alloys containing aluminum and iron; aluminum alloys containing silicon; high copper alloys containing substantial amounts of copper such as that containing nickel and copper with or without indium; zinc alloys, and copper zinc alloys; copper tin alloys; copper, silicon carbide alloys; zinc tin alloys; tin, antimony, copper alloys; tin itself; lead itself; lead tin alloys, and the like. Other materials that may likewise be applied are carbide alloys such as chromium carbide, nickel and chromium alloys; tungsten carbide and cobalt alloys; tungsten carbide and nickel alloys; titanium carbide and cobalt or nickel alloys; tungsten carbide and nickel, chromium, boron alloys, and the like.

Other materials that may be applied are refractory metals such as tungsten, titanium, molybdenum, or alloys thereof. In addition, self-fluxing alloys may be utilized as a material to be applied in a thermal spraying process such as nickel alloys containing chromium, boron, iron, silicon, and carbon, nickel, tungsten carbide, cobalt, chromium, iron, silicon, boron, and carbon alloys; tungsten carbide, cobalt, nickel, chromium, boron, iron, silicon and carbon, and the like.

Other materials that could be applied are tungsten carbides such as those that contain alloying amounts of cobalt and iron or tungsten carbide with cobalt by itself or tungsten containing substantial amounts of nickel, carbon, chromium, and the like.

Additional materials that may be applied are abradable coatings such as those contain boron nitride plus nickel alloy materials; nickel plus graphite composites; silicon, aluminum graphite composites; aluminum plus a polyester material; silicon, aluminum, polyimide material; aluminum, bronze plus boron carbide cermet material; nickel plus a graphite composite material, and the like.

A preferred class of materials that would applied would be the nickel aluminum alloys, in particular, nickel aluminide. It is most preferred that the material that is to be applied as the cavity to the body would be one that has a very high thermal conductivity. Listed in Table II below are materials that may be used because of their preferred thermal conductivity where the left hand margin indicates watts per thousand degree Kelvin as the thermal conductivity measurement.

TABLE II

| Thermally Conductive Materials Of Interest | |
|---|---|
| WATTS/METER K.° | MATERIAL |
| 400 | Silver (Pure) |
| | Copper (Pure) |
| | Cu/B$_4$C |
| | Gold |
| 300 | Cu/Ww |
| | Al/SiCw |

TABLE II-continued

Thermally Conductive Materials Of Interest

| WATTS/METER K.° | MATERIAL |
| --- | --- |
|  | Aluminum (Pure) |
|  | Cu/NI |
| 200 | Phosphor Bronze |
|  | Beryllium (Pure) |
|  | Titanium (Pure) |
|  | AlN |
|  | Magnesium |
|  | Tungsten |
|  | SiC |
|  | Al/SiCw |
|  | Molybdenum |
|  | Cu/Ni/Si |
|  | NiAl (Composite) Duplex |
|  | Aluminum, Mold Alloys |
|  | $TiB_2$ |
| 100 | CuBe |
|  | Cobalt, Nickel, Chromium |
|  | WC/Co |
|  | Iron |
|  | Cu/Al/Fe |
|  | Steel |
|  | Tool Steel |
|  | Stainless |
|  | Stellite |
|  | (cobalt chromium tungsten alloys) |

If the thermal spraying process utilizes wire which is heated and passed along through a gun apparatus, the wire would be comprised of the desired metallic component and sprayed onto the substrate.

It is to be appreciated that the spraying could take place in various atmospheres such as an atmosphere containing oxygen, nitrogen, and other reactive gases or non-reactive gases. The gases may react with the metallic material as it is sprayed or after it is in a molten state on the substrate. The resulting coating may have different portions of the gas/metal mixture as a portion of the cavities, by virtue of the spraying process in a desirable atmosphere. Preferably, however, the atmosphere is ambient air atmosphere which is a combination of oxygen and nitrogen.

The coating thickness that is to be applied can range from 0.1 millimeters to 50 millimeters, preferably, 0.5 to 20 millimeters, and even more preferably, 0.5 to about 5 millimeters.

It is to be appreciated that one may vary the thermal spraying materials based upon the end use of the mold. It may be desirable to have a first layer of a thermal spraying process which would be an anchoring layer with the substrate. A more durable or a higher strength material could then be applied onto the initial layer. Therefore, multiple layers may be applied to the body of the mold to achieve a cavity having a combination of properties, namely, good adherence to the substrate, and high durability for the compression involved in the molding operation.

It is to be appreciated that the coatings as applied may require subsequent processing steps such as buffing and polishing, grinding or machining, and the like, as is well known in the art.

It is likewise to be appreciated that the post treatment of the thermal sprayed coatings can take a variety of steps such as sealers or other corrosion protection. Preferably, however, a post treatment of heating or fusion may be utilized as desired. Other post treatments could include coating by impingement, electrolytic plating, electroless plating, nitriding, anodizing, and the like.

Figure 2:
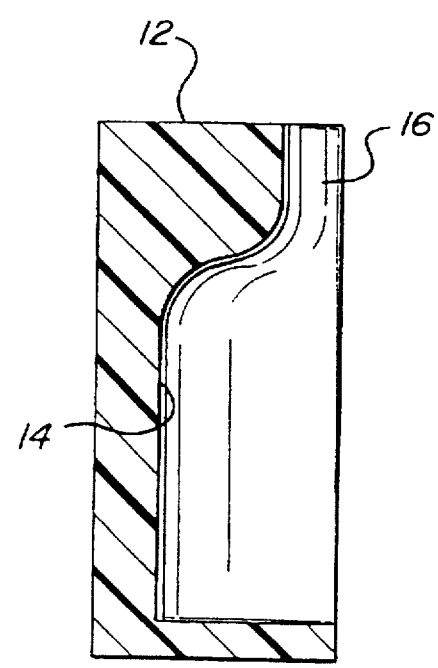
FIG. 2 is a cross-section of the mold or die of the present invention taken along lines 2—2 of FIG. 1.
Figure 3:
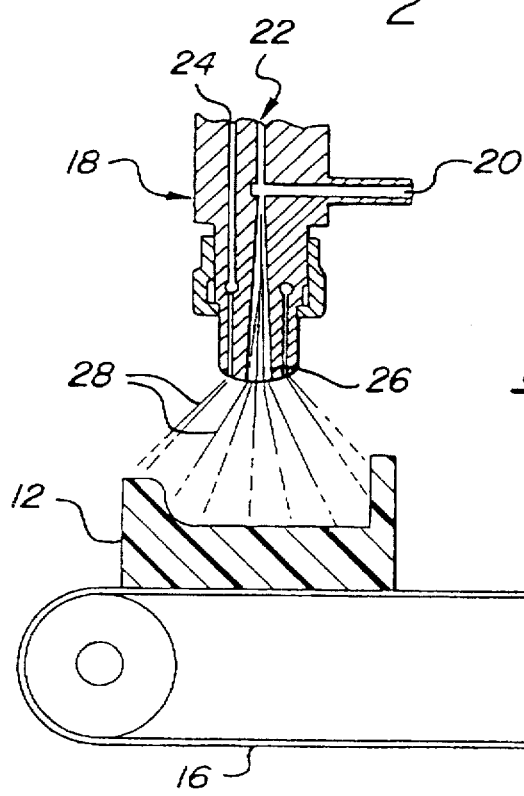
FIG. 3 is a schematic process describing the manufacture of the mold or die of the present invention.
Figure 3:
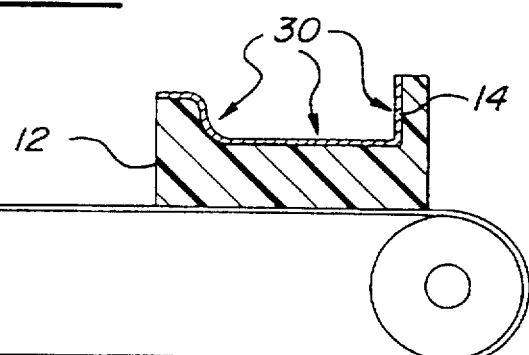

FIG. 1 shows the mold 10 of the present invention. A metallic body portion 12 has a cavity portion 14. Shown is a cavity for a blow molded bottle with a top portion 16. FIG. 1 is a perspective view of the mold, while FIG. 2 is a cross-section of the mold taken along lines 2—2 of FIG. 1. The thermal spray is applied in a process that would permit a high volume such as a movable conveyor 18 which passes the mold 10 within an appropriate distance from the gun 18. The gun has an inlet 20 for powder particles to be inserted therein from a hopper (not shown). A fuel gas inlet 22 can be ignited, thereby warming the powder to the molten state. There is optionally also an oxygen inlet 24 to assist in combustion. Particles thereby are sprayed through outlet 26, which particles 28 are now in the molten form schematically shown as a spray in FIG. 3. The mold 10, after the application of thermal spray, then has the cavity portion coated with the thermal spray coating 30. The outlet portion of the gun 26 may have placed thereon a coating to facilitate the movement of the particles through the outlet. This coating is generally a disulfide or a sulfide material of metallic character such as titanium, molybdenum, tantalum, and the like. The coating is generally applied by chemical vapor deposition utilizing techniques known in the art.

After an appropriate pair of molds are formed, they are held together in a molding process such as a blow molding process, as shown in FIG. 4. This demonstrates that the process permits the formation of a blow molded product such as a milk container 32, schematically shown in FIGS. 4 and 5, where the molding occurs in FIG. 4, while FIG. 5 shows the release of the blow molded product 32.

The mold of the present invention can be used for a variety of end uses. A preferred use is the application of the mold in the formation of plastic products. The plastic that may be utilized is one that can be blow molded, injection molded, and other molding techniques. The molding may also include a RIM process (reaction injection molding). The plastic materials may be thermoplastic materials such as those that soften upon the application of temperature and upon cooling conform to a new shape. A subsequent application of heat would allow the material to take on a new shape as desired. Thermoset materials are those that set within application of temperature and/or pressure and/or catalysts to a fixed and firm position. A subsequent application of a heat does not permit deformation, but rather destruction, of the bonds involved in the formation of the thermoset final product in the first place. Examples of thermoplastic materials are polystyrene, acrylonitrile, styrene acrylonitrile, polyvinyl chloride (PVC), polyethylene terephthlate (PET), polysulfone, polyethylene, polypropylene, high density and low density polyethylene materials, nylon materials, (polyamides), oxygen barrier materials such as PET, PPOH, PVDC (polyvinyl dichloride), polytetrafluoroethylene (PTFE), polyvinylidene chloride, polypropylene, polybutylene, polyisobutylene, and the like. With respect to thermoset materials, such materials may be epoxy materials, polyurethane materials, polyester materials, polyacetates, polycarbonates, poly(methyl) methacrylates, and the like. Also to be contemplated as plastic materials would be elastomeric such as rubber materials or synthetic rubber materials, styrene butadiene, isopropylene, and the like.

In general, if one utilizes the lightweight molds of the present invention for the thermal application of thermoset materials, the desired characteristics of the tooling would be to have good heat control, good heat transfer efficiency, wear resistance and chemical resistance. The tools that would be utilized are thermal forming tools or dies as well as injection molds. The materials that would preferably be utilized are urethanes, such as flexible foams, rigid foams and solids. Other materials would be epoxies; phenolics, such as novolacs; amines, such as polyamines; silicones, such as methochlorosilane; composites, such as engineering materials; thermoset polyesters and wood-containing materials; allyls, such as polyester resins derived from esters of allyl alcohol and dibasic acids. Common monomers are allyl diglycol carbonate, also known as diethylene glycol bis (allyl carbonate), diallyl chlorendate, diallyl phthalate, diallyl isophthalate and diallyl maleate.

The present invention is likewise applicable towards the shaping, forming and molding of thermoplastics. In that situation, the tooling should have the desired characteristics of having good thermal control, high-heat transfer efficiency, wear resistance as well as chemical resistance. The tooling that would be utilized would generally be blow molds, injection molds, as well as thermoform dies. The most preferred materials that would be formed are thermoplastic materials such as polystyrenics; ABS (acrylonitrile/butadiene/styrene); SAN (styrene/acrylonitrile polymer); polyethylene; polypropylene; polycarbonates; polysulfones; polyethylene terephthalates; polyamides such as nylon and the like; glass materials and metals such as aluminum, aluminum alloys, zinc and zinc alloys, copper, copper alloys, tin and tin alloys.

Another distinct advantage of the present invention is that the body in which the cavity is sprayed thermally is formed of material that is readily machined. Due to the ease of the machining of aluminum or wire mesh (or metal felt (fiber)) materials, a CAD/CAM device can be utilized to simplify the manufacture of a mold. After one selects the end use of the mold, namely the product to be molded, one can machine the mold reasonably inexpensively and quickly with a CAD/CAM device. Due to the wide-open nature of the body of the mold, it is relatively easy to machine to a desired configuration. In addition, due to the wide-open nature of the body of the mold, it is highly porous. The porosity would facilitate cooling of the mold, thereby increasing cycle time for molding operations.

More broadly, the molds, dies and forming tools can be designed to optimize the heat transfer efficiency for whatever part manufacturing task is to be done. The rate limiting step to the manufacturing cycle normally consists of the rate of heat flow through the plastics plus the rate of heat flow from the mold. With the technology described herein, one can significantly decrease the heat flow contribution from the mold. Hence, the manufacturing cycle time for plastic part production can be decreased significantly.

A wide variety of shapes can be molded. The appropriate configuration for the mold can be designed utilizing a CAD CAM technique. Three dimensional datasets for a particular configuration can be obtained from Viewpoint Corporation's (of Oren, Utah) dataset catalog. The dataset could be of a bottle, whether it be plastic or glass, or other industrial configuration such as beepers, telephone handsets, computer keyboards, computer covers, gavels, guitars, and the like. With utilization of such 3-D datasets, one can then configure the mold that would be used to form the final end product utilizing the techniques as described herein for the convenient shaping of the mold itself.

Some particular uses of the molds for fabrication are described below.

One could use the molds of the present invention for the fabrication of urethane foam parts for automotive seating. The desired mold characteristics would be that they would have an isothermal molding surface, moderate heat transfer efficiency, moderate compression strength, good release surface (renewable), long-wearing closure surfaces, and be lightweight. The desired mold body would be comprised of aluminum. The materials of construction for the mold body would preferably be a screen or a foam or jack straws or a honeycomb structure, or the power-packing media as described above. The materials of construction for the mold cavity would preferably be aluminum, or aluminum graphite spheres, or ultra high molecular weight polyethylene. For the latter technique, the high melting temperature polyethylene would be stable at the foam formation temperature of the urethane, which is generally 150°–200° F. The polyethylene is stable at that temperature and the foamed urethane may be separated therefrom.

It is to be appreciated that the application of the ultra high molecular weight polyethylene will use commercially available equipment. It is usually different than that used for the application of metals. Such equipment may be similar to that used in powder coating processes. The powder is generally applied by an air atomization process (charged or otherwise) directly onto a heated substrate which is then subjected to a heat curing process.

It should also be appreciated that a variety of high temperature thermoset or thermoplastic powder materials may be coated. They may be polyethylene, polypropylene, epoxies, polyamides as nylons, (meth)acrylics, polyphenylene sulfide, polysulfone, polybenzimidazole, and the like.

When a plastic powder material is used, the cavity is preferably previously formed by the thermal sprayed metallic particles as described herein. This provides a smoother surface for the application of the plastic powder.

The molds of the present invention could also be used for the fabrication of plastic containers via blow molding. In that situation, the desired mold characteristics would be an isothermal molding surface, a high heat transfer efficiency, moderate compression strength for the cavity, high quality finish, lightweight, non-corroding surface finish, and a high compression strength for the mold closure surfaces. The body mold would be comprised of aluminum. The materials of construction for the lightweight portion of the mold body would be preferably a screen, or foam, or felt, or packing-tower media. The materials of construction for the mold cavity would preferably be aluminum with nickel electroplated on top or aluminum with trinickel aluminide on top or aluminum with titanium nitride on top.

The tooling for fabrication of aluminum diecasting would be of a nature that the mold or the die would have a high resistance to thermal cycle fatigue and thermal shock during mold filling and emptying. In other words, there would need to be high, hot strength and toughness as well as having high thermal conductivity, that is, greater than about 100 watts/meter—Kelvin, as well as have low coefficient of thermal expansion. The tooling likewise would need to have high resistance of the materials of construction to erosion and wetting by the molten aluminum. In other words, low solubility of materials of construction in molten aluminum, high thermodynamic stability of the materials of construction in relationship to molten aluminum, and lastly, have high melting point for the materials of construction. The materials of construction for the tool body preferably would be copper/dichromium-niobide, nickel or stainless steel, or nickel aluminide. The form of the materials of construction for the body of the tooling would be preferably foam, or screen, or felt, or tubing, or honeycomb, or perforated sheet/plate, or sintered walls. The materials of construction for the cavity membrane would preferably be nickel aluminide/nickel aluminide molybdenum/molybdenum; trinickel aluminide/trinickel aluminide-molybdenum/molybdenum; nickel aluminide/nickel aluminide-molybdenum/molybdenum; nickel/nickel molybdenum/molybdenum; nickel/nickel-boron/nickel boron/trinickel aluminide; molybdenum; molybdenum/molybdenum-boron/molybdenum boron. With respect to the details of construction for the mold, one should combine the solid petitions and low density volumes as required. An inexpensive filler may be used in the bottom of the mold. One can also use an open matrix structure so as to enlarge the thermal sprayed membrane. One can also use a structure which can be readily recycled and repaired.

As to the tooling for the fabrication of molten glass, the properties of the tooling should be such that they are resistant to thermal cycle fatigue and thermal shock. In other words, the tooling should have superior high strength and toughness as well as have low thermal coefficient of thermal expansion and have an adequately high thermal conductivity (greater than 100 watts/meter—Kelvin). In addition, the tooling should have a high resistance to the corrosive action of molted glass. The materials should have a high melting point, yet have low solubility of the materials of construction in molten glass. The tooling should have surface modifications which permit a protective coating to the working surface of the tools. The tooling should have high resistance to the oxidizing strength of molten glass yet have high thermal conductivity stability of the materials of construction to molten glass. The tooling should have surface modifications which permit protective coating to the working surface of the tools yet have a high wear-resistance to the wear of the working surface of the tool created by the molten glass. The tooling should have a high hot hardness. The tooling should have a high modulus at elevated temperatures, high gloss surface for aesthetics, and have a fine grain size via thermoplasma spray coating of fine powders used for the materials of construction of the cavity membrane or coating.

The materials of construction for the tool body are preferably nickel, chromium/dichromium niobide, stainless steel, iron steel, graphite, nickel carbide, or nickel aluminide.

The form of materials of construction for the body itself preferably would be a foam or a screen or sintered walls, or tubes or honeycombs, or felt.

The materials of construction for the cavity membrane may be as follows (multiple layers as indicated):

Ni—Al/Ni—Al—Mo/Mo

Ni3Al/Ni3Al—Mo/Mo

NiAl/NiAl—Mo/Mo

Ni/Ni—Mo/Mo

Ni/Ni—B/NiB

Ni3Al

Mo

Mo/Mo—B/MoB

The tooling for the fabrication of the molding compound-based parts are as follows. The tool characteristics should have an isothermal molding surface; 300° F. operating temperature; mar and wear-resistant surface; class A, super finish surface; 3–500 psi (minimum) compression strength; be lightweight and reasonably good heat transfer efficiency. The materials have of construction would be aluminum and stainless steel preferably. The types of materials of construction for the tool body would be screen or packing-tower material, or jack straws, or honeycomb, or foam, or felt. The materials of construction for the tool forming surfaces would preferably be aluminum/nickel aluminide or aluminum/electrolytic application of nickel, or stainless steel.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or scope of the invention.

What is claimed is:

1. A method of making a mold or die comprising the steps of:
   (a) providing a porous heat exchanging body support member having a defined porosity;
   (b) forming a cavity of predetermined configuration in a surface of the support member; and
   (c) applying to the configured cavity in the support member a metallic surface thereby producing a mold or die.

2. The method of claim 1 wherein the metallic surface is applied to the support member by thermal spraying metallic particles onto the support member.

3. The method of claim 1 wherein the body is comprised of a foamed metal.

4. The method of claim 3 wherein the foamed metal is comprised of aluminum.

5. The method of claim 1 wherein the body is comprised of wire screen members having apertures for flow of coolant therethrough.

6. The method of claim 1 wherein the mold cavity has the strength to form molded plastic pieces.

7. The method of claim 1 wherein the mold cavity has the strength to form molded metallic pieces.

8. The method of claim 1 wherein the body support member is porous metal.

9. The method of claim 1 wherein the body support member is comprised of felt metal.

10. The method of claim 1 wherein the body support member is comprised of fibrous metal.

11. The method of claim 1 wherein the body support member is comprised of metallic structured packing.

12. The method of claim 1 wherein the body support member is comprised of metallic tower-packing.

13. The method of claim 1 wherein the body support member is comprised of metallic Raschig rings.

14. The method of claim 1 wherein the body support member is comprised of corrugated wire gauze.

* * * * *